(12) United States Patent
Mercuriali et al.

(10) Patent No.: US 7,480,285 B2
(45) Date of Patent: Jan. 20, 2009

(54) METHOD FOR SETTING UP COMMUNICATION PATHS BETWEEN ACCESS POINTS OF A SWITCHING SYSTEM, AND SWITCHING SYSTEM IMPLEMENTING THE METHOD

(75) Inventors: Jean-Pierre Mercuriali, Orsay (FR); Emmanuel Chevrier, Limours (FR)

(73) Assignee: Aastra Matra Telecom, Guyancourt (FR)

( * ) Notice: Subject to any disclaimer, the term of this patent is extended or adjusted under 35 U.S.C. 154(b) by 843 days.

(21) Appl. No.: 10/451,560

(22) PCT Filed: Dec. 11, 2001

(86) PCT No.: PCT/FR01/03918

§ 371 (c)(1),
(2), (4) Date: Jun. 23, 2003

(87) PCT Pub. No.: WO02/052826

PCT Pub. Date: Jul. 4, 2002

(65) Prior Publication Data

US 2004/0037270 A1 Feb. 26, 2004

(30) Foreign Application Priority Data

Dec. 22, 2000 (FR) .................................. 00 16928

(51) Int. Cl.
*H04L 12/66* (2006.01)
(52) U.S. Cl. ...................... 370/352; 370/353; 370/400
(58) Field of Classification Search .................. 370/352, 370/466
See application file for complete search history.

(56) References Cited

U.S. PATENT DOCUMENTS

| 6,151,390 | A | * | 11/2000 | Volftsun et al. | ............. | 379/229 |
| 6,198,738 | B1 | | 3/2001 | Chang et al. | | |
| 6,501,734 | B1 | * | 12/2002 | Yu et al. | ..................... | 370/236 |
| 6,628,660 | B1 | * | 9/2003 | Morse | ..................... | 370/395.7 |

(Continued)

FOREIGN PATENT DOCUMENTS

EP 0 790 748 8/1997

(Continued)

OTHER PUBLICATIONS

"Internet Portocol", Request For Comment (RFC) 791 published by Internet Engineering Task Force (IETF) in Sep. 1981.

(Continued)

*Primary Examiner*—Creighton H Smith
(74) *Attorney, Agent, or Firm*—McCracken & Frank LLP

(57) ABSTRACT

Access points of a system are located either in a packet transmission network or at interfaces connecting switching units provided with gateways with the packet network. Call servers store context data concerning terminals connected to the system through the access points. When a communication path is set up through a gateway to connect first and second terminals, the servers associate an addressing resource of the gateway in the packet network with a portion of the path providing the connection with the first terminal and an addressing resource of the gateway in the switching means with a second portion providing the connection with the second terminal, and store, in the context data concerning the second terminal, an identification of said addressing resource of the gateway in the packet network.

17 Claims, 7 Drawing Sheets

U.S. PATENT DOCUMENTS

| | | | |
|---|---|---|---|
| 6,674,746 B1 * | 1/2004 | Lamarque, III | 370/352 |
| 6,741,610 B1 * | 5/2004 | Volftsun et al. | 370/466 |
| 6,842,452 B1 * | 1/2005 | Muller | 370/389 |
| 7,423,983 B1 * | 9/2008 | Li et al. | 370/280 |
| 2003/0103493 A1 | 6/2003 | Mercuriali et al. | |

FOREIGN PATENT DOCUMENTS

| | | |
|---|---|---|
| EP | 0 966 145 | 12/1999 |
| FR | 2808640 | 11/2001 |
| FR | 28114948 | 1/2002 |
| JP | 10303990 | 3/2002 |
| WO | WO 00/70844 | 11/2000 |
| WO | WO 01/20859 | 3/2001 |
| WO | WO 01/26351 | 4/2001 |

OTHER PUBLICATIONS

RTP, "Real Time Protocol" and RTCP, "Real Time Control Protocol", RFC 1889, IETF, Jan. 1996.
"Megaco Protocol", Internet draft, IETF, Feb. 21, 2000.
TCP "Transmission Control Protocol", RFC 793, IETF, Sep. 1981.
UDP "User Datagram Protocol", RFC 768, IETF, Aug. 1980.
International Search Report dated Mar. 6, 2005, PCT/FR01/03918.

* cited by examiner

METHOD FOR SETTING UP COMMUNICATION PATHS BETWEEN ACCESS POINTS OF A SWITCHING SYSTEM, AND SWITCHING SYSTEM IMPLEMENTING THE METHOD

BACKGROUND OF THE INVENTION

The present invention relates to a method for setting up communications between access points of a switching system.

The invention applies in particular, but not exclusively, to an automatic switch exchange network (PABX) in which access points (lines to terminals or radio bases, links to networks or to leased lines, etc.) are organized into clusters each managed by a cluster control unit (CCU). Each cluster control unit possesses a certain autonomy so as to manage the communications or other provisions of services involving the access points which depend thereon. In particular, the CCU comprises a memory wherein are stored tables containing various data relating to the terminals which are connected to it and making it possible in particular to manage the capabilities available to the terminals.

This hardware architecture gives rise to the software concept of a half-call. The signalling processing relating to the setting up of a communication (or other provision of service) through an access point comprises on the one hand control tasks for monitoring the access point so as to identify events (off-hook, on-hook, dialing, busy, etc.) emanating from an access point and translating them into messages of the switching system and for addressing various commands to the access point (ringing, tones, displays, etc.), and on the other hand call management tasks for processing the requests relating to the access point (as a function in particular of the rights defined in the tables) and for supervising the control tasks for monitoring the access point. The signalling relating to a communication between several access points proceeds through exchanges of messages between the half-calls concerned. Advantageously, the call management tasks use messages according to formats and protocols which are standardized in the switching system, while the access point monitoring tasks deal with the translations required for taking account of the specifics of the various types of terminals or of networks, that can be linked up.

The above architecture is, well suited to the case of fixed terminals connected to the CCU at invariable addresses. The half-call relating to such a terminal can be executed entirely at the level of the CCU to which it is linked (reference CCU). Patent application EP-A-0 790 748 describes a way of adapting it to the case of mobile radio terminals which can enter into communication by means of radio bases connected to visited CCUs distinct from their reference CCUs, the reference CCU of a terminal generally being that where the relevant data relating to this terminal are stored.

The success of networks operating according to the IP protocol ("Internet Protocol", Request For Comment (RFC) 791 published by the Internet Engineering Task Force (IETF) in September 1981) has led to the, development of real-time protocols (RTP, "Real Time Protocol" and RTCP, "Real Time Control Protocol", RFC 1889, IETF, January 1996) capable of supporting telephony traffic. Telephony terminals are now available that link up to such networks ("IP terminals"). These IP terminals may in particular take the form of conventional telephones associated with appropriate adapters, of telephone terminals which can be linked directly to the IP network (for example "Webphone"), or microcomputers equipped with telephony software (for example "Netmeeting" marketed by the Microsoft company).

The success of IP networks suggests moreover their use within the domain of switching, and more particularly within the domain of company switching, to connect together various entities of the switching system. The local IP network of a company (Intranet) can thus serve to interconnect distinct automatic switch exchanges. Furthermore, an IP network can advantageously provide a means of connection for IP terminals, so that one can envisage the implementation of voice and data communication systems operating entirely according to the IP protocol. The IP terminals are then managed by call servers connected directly to the IP network. French Patent Application No. 00 08897 describes an example of an architecture of such systems.

The coexistence of the two architectures mentioned above is made indispensable by the need to take account of the current infrastructures in the process of migration toward networks operating entirely according to the IP protocol.

In an architecture combining PABX networks of the type indicated above and packet switching networks, certain of the CCUs ("Gateway CCUs") are then equipped with gateway interfaces with a packet switching network such as an IP network. These gateway interfaces perform the conversion of the streams exchanged between the two types of network, in such a way as to comply with the manner of operation of a media gateway (or MGW) and of its controller ("Media Gateway Controller" or MGC) as described in the TIPHON ("Telecommunications and Internet Protocol Harmonisation Over Networks) project of the ETSI ("European Telecommunication Standard Institute"). Such a gateway interface provides an access point connected to the IP network, and makes it possible moreover to implement communications over the IP network involving analog or digital "conventional" terminals that are not directly linked to the IP network, without however necessarily comprising an access point for these "conventional" terminals. Conversely, an MGW typically provides an access point for various types of "conventional" terminals, and comprises an access point connected to the IP network.

It is thus possible to envisage the setting up of communication paths between all types of terminals carried or otherwise by the IP network. Patent application PCT/FR00/02740 describes a way of optimizing the setup of the communication path when a gateway interface with an IP network is involved.

The choice of the communication path can be made on request by a topology server, as a function of criteria specific to the system, and information regarding the location of the terminals involved in the communication.

This process, when it leads to the setting up of a communication path between the PABX network and the packet switching network, uses resources of the gateway CCU while communicating.

However, such flexibility gives rise to cost constraints, in particular with the prospect of a rapid increase in the traffic over packet switching networks. Specifically, the large number of conventional terminals installed on existing traditional networks benefiting from updating with interfaces to packet transmission networks makes it possible to forecast massive use of gateway interfaces, so that it is desirable to optimize the switching systems with a view to optimal use of these gateways, the unit cost of which is relatively high.

For example, the possibility of making simultaneous multiple calls from one and the same terminal, conventional or IP, may lead to the reserving of several gateways, each for a simple call, while the user will use just one of them at a given instant. This example is in particular that of operator stations in a communication system.

An object of the present invention is to optimize the use of the resources mobilized by communications in networks using gateways of the kind indicated above.

SUMMARY OF THE INVENTION

The invention thus proposes a method of setting up communication paths between access points of a switching system, the switching system comprising a packet transmission network affording a first family of access points, switching means equipped with linking interfaces affording a second family of access points and with at least one gateway interface with the packet transmission network, and call processing means for storing configuration data and context data relating to terminals connected to the system through the access points, and for performing signalling processing relating to said terminals. The setting up of a first communication path between access points so as to connect up first and second terminals respectively connected to said access points comprises the following steps when the first path comprises at least one first portion belonging to the packet transmission network and one second portion belonging to the switching means with a gateway interface between said first and second portions:

associating with said first portion an addressing resource of the gateway interface in the packet transmission network for the connection with the first terminal;

associating with said second portion an addressing resource of the gateway interface in the switching means for the connection with the second terminal;

storing, in the context data relating to the second terminal, an identification of said addressing resource of the gateway interface in the packet transmission network.

Thus, the second terminal will be able to exhibit a "double appearance" in relation to the other access points of the system, namely the native appearance of its access point, and the complementary appearance corresponding to the other access point family. This complementary appearance is effected by storing in the context data of the terminal an addressing resource of a gateway associated therewith during the setting up of the first communication path.

The call processing executed for another terminal which has to enter into communication with it will thus be able to choose, from among these two appearances, that which allows the most judicious use of the resources of the gateways.

In particular, in order to connect up the second terminal with a third terminal without cutting the connection with the first terminal, the call processing means can read, from the context data relating to the second terminal, the stored identification of said addressing resource of the gateway interface in the packet transmission network, and can set up a second communication path including the second portion of the first path and at least one other portion belonging to the packet transmission network, and with which they associate the read addressing resource of the gateway interface for the connection with the third terminal.

The process is symmetric, so that, in an alternate or cumulative manner, the setting up of the first communication path can comprise the storage, in the context data relating to the first terminal, of an identification of said addressing resource of the gateway interface in the switching means.

Another object of the present invention relates to a switching system comprising a packet transmission network affording a first family of access points, switching means equipped with linking interfaces affording a second family of access points and with at least one gateway interface with the packet transmission network, and call processing means for storing configuration data and context data relating to terminals connected to the system through the access points, and for performing signal processing relating to said terminals in accordance with a method as defined hereinabove.

DESCRIPTION OF PREFERRED EMBODIMENTS

Figure 1:
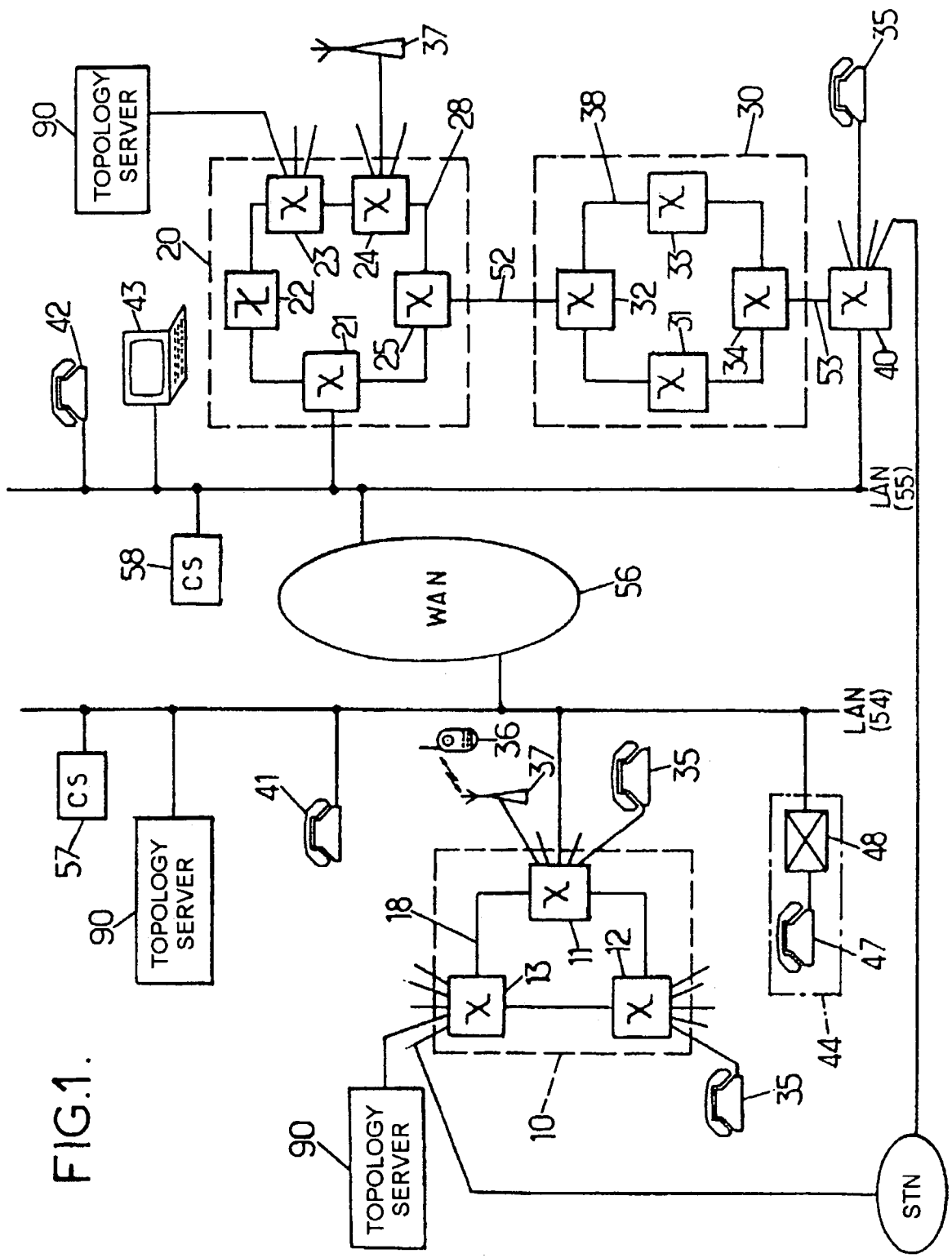
FIG. 1 is a diagram of a switching system according to the invention.

FIG. 1 shows an exemplary communication system constructed from an IP network consisting of two local area networks (LANs) 54, 55 connected together by way of an extended network (WAN, "Wide Area Network") 56. The WAN plays the role of interconnection between the subnetworks 54, 55 formed by the LANs. It could advantageously be replaced with a backbone if the load constraints of the system so justified.

The system incorporates on the one hand one or more automatic switch exchanges (PABX) or sites 10, 20, 30, 40. Each site has an organization into clusters. It thus comprises one or more cluster control units (CCU) 11-13, 21-25, 31-34, 40. Each CCU possesses sufficient resources to support the communications between its own access points.

Each site 10, 20, 30 comprising several CCUs is equipped with a transport loop 18, 28, 38 allowing inter-CCU exchanges in such a way as to support the communications between several access points belonging to one and the same site. By way of example, the loop 18, 28, 38 can be a 40 Mbits/s digital line organized under time-sharing to support 512 circuit switching channels ("circuit channels") and 70 packet switching channels ("packet channels"). The circuit channels are provided in respect of the access points whose manner of operation requires the reserving of a circuit resource, while the packet channels are provided in respect of the access points used by packet switching communications and in respect of the exchanges of commands specific to the switching system (in particular the signalling functions). Control units (not represented) are provided in the sites 10, 20, 30 for supervising the operation of the transport loops 18, 28, 38. When the system comprises several sites, inter-site lines 52, 53 (for example private PCM lines or those rented from a public operator) are possibly provided between certain of their CCUs 25, 32, 34, 40.

Various IP terminals 41-44 are connected directly to the LANs 54, 55. An IP terminal 44 may be a conventional telephone 47 associated with an adapter 48 for linking it to the IP network, a telephone terminal 41, 42 incorporating an IP interface or else a microcomputer 43 executing a telephony over IP network application. In a manner known per se, the adapter 48 consists of a media gateway (MGW), possibly driven by a media gateway controller (MGC) (not represented in the figure) supporting protocols such as Megaco (see "Megaco Protocol", Internet draft, IETF, Feb. 21, 2000).

In the example represented, each cluster control unit comprises a batch of system access points, which may serve as interface with various types of lines, according to the compatibilities desired. It is in particular possible to provide access points for linking conventional (that is to say non IP) telephony terminals 35, analog (simple S63 terminals or "intelligent" terminals) or digital (X.25, ISDN terminals etc.). For external communications, one or more CCUs 13, 40 may moreover comprise interfaces for linking to external networks such as a switched telephone network (STN) 50, an integrated services digital network (ISDN) and/or a packet switching digital network (X.25). In order possibly to allow communications with mobile terminals 36 (for example CT2 or DECT), certain CCUs may comprise radio access points connected to respective radio bases 37. In this case such an access point is of "conventional" type. If the base is connected to the system by way of the IP network, the corresponding access point will be of IP type.

Certain CCUs 11, 21, 40, so-called gateway CCUs, are also connected to the LANs 54, 55. Each gateway CCU is provided with one or more gateway interfaces each having a determined address in the IP network. In the example represented, the sites 10, 20 and 40 are respectively connected to LANs 54, 55 and 55 by their gateway CCUs 11, 21 and 40.

Figure 2:
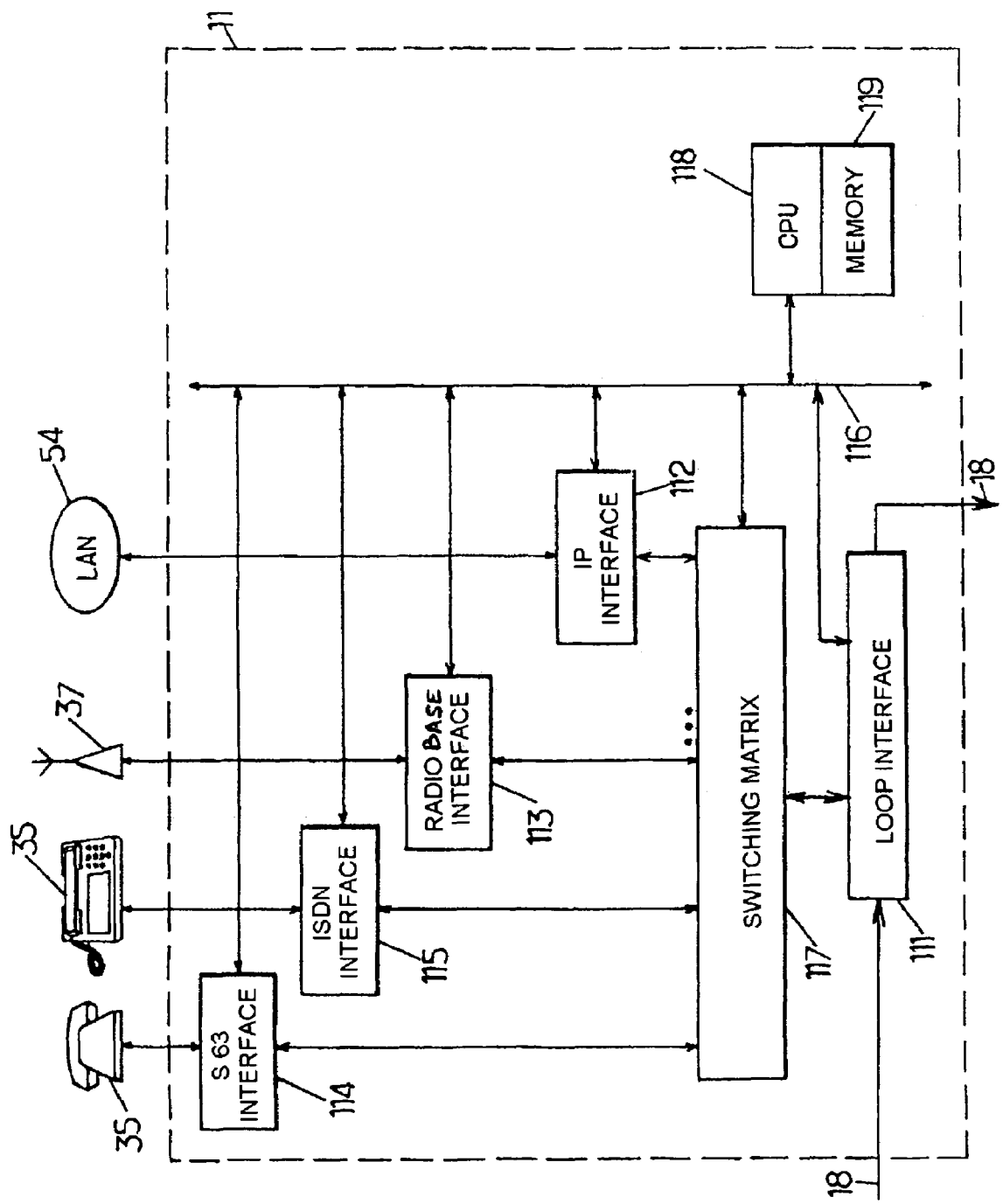
FIG. 2 is a schematic diagram of a cluster control unit of the system of FIG. 1.

FIG. 2 is a basic diagram of a gateway CCU 11, which comprises a batch of access points, as well as, if appropriate, an interface 111 with the transport loop 18 of the site. The CCU 11 incorporates access points for analog terminals 32, ISDN terminals 34 and for the linking of radio bases 37, as well as a gateway access point for linking to the LAN 54. The interface 111 with the transport loop 18 of the site consists for example of repeaters for retransmitting the frames traveling around the loop 18, which are associated with an automaton for separating the packet channels and the circuit channels and with buffer memories for extracting and exerting signals relating to the CCU.

Each access point of a CCU 11 comprises a physical interface 112-115, which caters for the physical functions of signalling (detection of events, commands, etc.); of translation and of shaping which are necessary for the compatibility of the facilities linked to the access points with the formats used in the switching system.

Each of the interfaces 111-115 is connected to the bus 116 of a processor 118 associated with a memory 119. They are moreover connected to a switching matrix 117, which carries out a physical switching, under the stewardship of the processor 118, between channels multiplexed temporally in accordance with a multiplexing scheme specific to the CCU. The processor 118 caters in particular for the signalling processing relating to the access points of the CCU: it is informed of the events detected by the interfaces 111-115 and performs the appropriate processing for configuring the switching matrix 117, addressing signalling messages to the interface 111 and commands to the physical interfaces 112-115.

The IP interface 112 is connected to the LAN 54, at an IP address allotted to the gateway CCU. Under this address, it uses one or more TCP ("Transmission Control Protocol", RFC 793, IETF, September 1981) logic gates for the signalling exchanges, and UDP ("User Datagram Protocol", RFC 768 IETF, August 1980) logic gates for various RTP/RTCP sessions open to transport coded speech. The RTP/UDP ports are associated with translation modules connected to the switching matrix 117.

The IP terminals 41-44 are advantageously managed by two call servers 57, 58 connected directly to the IP network 54-56 according to standardized protocols, for example in accordance with the H.323 standard of the ITU (International Telecommunications Union), directly or by way of proxy servers (see French Patent Application No. 00 05824). There could also be a single call server for the entire IP network. In a second embodiment of the invention, each of these call servers corresponds to the call server of a gateway CCU 11, 21, 40. Such CCUs then serve as reference CCU for IP terminals, which a priori know only the IP address of the gateway interface of their reference CCU, to which they address their requests, and whose gateway interface subsequently relays, if appropriate as a function of the configuration of the communication path, the voice signals to the destination. Conversely, in a third embodiment of the invention, the conventional terminals 35 and 36, which can reach the IP network only through the PABXs 10, 20, 30, 40, may be attached to a call server situated on the IP network. For this purpose it is sufficient for the CCUs to relay the signalling between these terminals and gateway interfaces. In the limit, only one call server on the IP network could be used for all the terminals.

A terminal linked to the IP network knows a priori only the IP address of its call server, and it addresses its requests to this server. However, a terminal linked to the PABX network knows its reference CCU, with which it can always get in touch (by way of the packet channels of the PABX network).

In the rest of the present description it is assumed, without being limiting, that an IP terminal can send and receive speech coded according to the ITU-T G.729 standards (8 kbit/s. coding by linear prediction with excitation by coded sequences with conjugate algebraic structure—CS-ACELP), ITU-T G.723.1 (compression by predictive coding at 6.4 or 5.3 kbit/s), and possibly ITU-T G.711 (64 kbit/s PCM coding), and that the transmission of speech within the PABX sites, between the PABX sites and the conventional terminals 35 and between the PABXs and the radio bases 37 is in the G.711 form. Thus the gateway interface 112 is designed to perform a G.711/G.723.1 or G.711/G.729 transcoding when this is required for an IP terminal operating in G.723.1 or G.729.

Two software utilities, the ICM (InterCommunications Manager) and the CPM (Communication Path Manager), perform, when invoked by the call processing tasks, the management of the signalling channels and of the communication paths, respectively. For the sending and receiving of its messages, the call processing addresses itself to the ICM in the form of primitives. Through addressing mechanisms which are known per se (point-to-point addressing, broadcasting, selective broadcasting, etc.), it is possible to reach one, several, or all the call servers of the system. In conjunction with the operational system of the call server on which it is installed, the ICM manages the routing of the messages. For seizure/release and connection/disconnection of the communication path, the call processing addresses itself to the CPM also in the form of primitives. When dealing with the reserving of a path, the CPM utilities of the two half-calls talk directly to one another.

A half-call relating to a terminal comprises the creation of a so-called Simple Call Monitor task (T_SCM) in a call server associated with the terminal, whether or not it is integrated into a CCU or PABX. This task T_SCM carries out all the analysis and decision functions (call routing, request for capability, etc.) involved in the call management. For these functions, the T_SCM task consults tables stored in the call server, containing in particular the association between the directory number of the terminal and a corresponding IP address, at which this terminal can be reached. This address may be the terminal's own IP address if it is of IP type or the IP address of a gateway interface otherwise. These tables moreover define the user's rights.

In the rest of the description it will be considered that when a call server, associated with a terminal, is integrated into a CCU of a PABX 10, 20, 30, 40, this server is located in the reference CCU of the terminal. Thus, each telephone terminal 35 and 36 linked directly to the PABX network has a host CCU (reference CCU) which, in the case of a wire terminal, is typically that to which it is linked. This host CCU caters in particular for the signalling processing relating to the terminals.

Each terminal of the system is managed by a call server, organized according to the various possibilities set forth hereinabove, which has location information relating to each supervised terminal. This location information consists of the identification of a CCU of the PABX network, the so-called "topology reference CCU". The topology reference CCU coincides with the reference CCU, as appropriate. When no reference CCU is attached to a terminal linked to an access point of the IP network, the topology reference CCU is also chosen from among the gateway CCUs linked to the same subnetwork as the terminal. In the case represented in FIG. 1, the gateway CCU 11 is for example a topology reference CCU of the IP terminals 41 and 44 connected to the LAN 54, while the gateway CCU 21 is the topology reference CCU of the IP terminals 42 and 43 connected to the LAN 55.

As seen previously the call server of a terminal linked to an access point of the IP network may, in the second embodiment of the invention, be the server integrated into one of the CCUs of the PABX network, the so-called reference CCU of the terminal, in which case the entire batch of terminals of the system has a reference CCU. The reference CCU of a terminal linked to an access point of the IP network then coincides preferably with the reference CCU of the terminal. Each IP terminal stores the address in the IP network of a gateway interface of its reference CCU, to which it addresses all its requests.

By way of, example, the signalling is transmitted over the IP network in accordance with the ITU-T H.323 standard in TCP transport protocol sessions set up between two call servers or between an IP terminal and its call server. In the second embodiment of the invention, the gateway CCU then plays, viewed from the IP network, a role of "gatekeeper" in the sense of H.323.

Another possibility is to code presentation grids defined for the switching system by means of a page description language such as XML ("extended Markup Language"), as described in patent application WO 00/70844. If the terminal is adapted to this type of presentation, it displays the system-specific grids described in the XML messages constructed by its gateway interface, and it can provide the signalling information required in response to these messages.

Various types of software modules are used to perform the signalling processing. A half-call thus comprises the creation of a T_MGC task which carries out the functions of interface with the T_SCM task of the call server, while a T_MGW task manages the details specific to each type of access point. Thus, the T_SCM task executed in the call server handles only terminal equipment identified by IP and/or directory numbers.

The charts of FIGS. 3 to 7 consider the setting up of communication paths between two terminals, one the requester ("rr") and the other requested ("rd"). It will be observed that the call scenario is essentially the same when one of the access points concerned is connected to a network external to the system and not to a terminal: the external party may be requester or requested, and the corresponding half-call will typically be executed in the CCU equipped with the interface for linking to the external network.

Each half-call relating to a terminal involves the execution of a call processing task (T_CAP), which groups together the aforesaid T_SCM and T_MGC/T_MGW tasks. Depending on the architecture of the call servers, these T_SCM and T_MGC/T_MGW tasks can be executed at the level of different entities communicating with one another according to appropriate protocols. It is for the sake of clarification of the presentation of the call scenarios that the invention is illustrated in the particular case where the whole of the T_CAP task is executed in a reference CCU, thereby avoiding the need to distinguish between T_SCM, T_MGC and T_MGW. The left part of each chart corresponds to the requester half-call, and the right part to the requested half-call.

Each call scenario represented commences with an exchange of information between the requester terminal 70, 170 and the T_CAP task 71, 171 corresponding thereto. Each T_CAP task has for example been created by the call server of the requester terminal 70, 170 on receipt of a message signaling line seizure by this terminal. It addresses to the terminal the grids coding the information to be presented to the user (displays, tones, etc.), and recovers the data provided by the user so as to define his request (choice of functions, dialing, etc.). When the exchange with the requester terminal 70, 170 allows it to have sufficient information, the T_CAP task 71, 171 broadcasts in the system a setup message (SET_UP) comprising in particular the following elements:

- the directory number of the requester terminal 70, 170;
- the directory number of the requested terminal 80, 180, defined directly or indirectly by the user of the requester terminal 70, 170;
- the location of the requester terminal 70, 170 in the system, namely the site number of the topology reference CCU and the number of this CCU in the site;
- the type of linkup of the requester terminal, featuring in the tables of its reference CCU whose call server executes the T_CAP task 71, 171; this element makes it possible in particular to distinguish between "conventional" terminals and IP terminals.

For a requester terminal of conventional type, the setup message further comprises a physical appliance number designating the interface of the site to which the terminal is connected. In certain cases, it furthermore comprises the IP address of at least one gateway interface of a CCU temporarily associated with the terminal in the network 54-56 and two. UDP port numbers reserved under this interface for this terminal, one dedicated to the transmission of speech according to the RTP protocol and the other to the transmission of control information according to the RTCP protocol.

For a requester terminal of IP type, the setup message comprises an indication of the codings and of the throughputs with which it is compatible (in the simplified example mentioned above, G.711 only, G.711+G.723.1, G.711+G.723.1+G.729 or G.711+G.729), the IP address of the terminal in the network 54-56, a UDP port number that it devotes to the transmission of speech according to the RTP protocol and another UDP port number for the transmission of control information according to the RTCP protocol.

The call servers to which this message is broadcast analyze the number of the requested terminal. The only server that takes account of the message, by creating a T_CAP task 81, 181 for processing the half-call on the arrival side, is the call server which supervises the requested terminal. This task 81, 181 interrogates a topology server 90 to determine a configuration of the call.

In the example represented in FIG. 1, the system comprises three topology servers 90, two of which are connected to access points, respectively of the CCU 13 of the site 10 and of the CCU 23 of the site 20, and the third directly to the IP network 54-56. These servers essentially contain the same data. One of them is selected by the call processing task currently being executed. It will be noted that numerous other implementations would be possible, for example the provision of a single topology server or more, or again the embodying of the topology server in the form of tables simply stored in each call server liable to be interrogated.

The topology server 90 is interrogated on the basis of two sets of parameters, one relating to the requester terminal 70, 170 and the other relating to the requested terminal 80, 180. Each parameter set relating to a terminal comprises:
- the type of link up of the terminal (IP or conventional);
- the location in the system (site numbers of the topology reference CCU and number of this CCU in the site);
- for a terminal of IP type, the indication of the codings and of the throughputs with which it is compatible.

For the requester terminal, these parameters are obtained by the T_CAP task 81, 181 in the setup message received. For the requested terminal, they are read from the terminal-specific data stored in the server of the CCU, by means of the directory number obtained in the setup message received.

The topology server receives requests sent by the call processing task on the arrival side (requested) in response to the receipt of the communication setup message (SET_UP).

The call configuration designated by the topology server 90 in response to its interrogation leads in certain cases to the setting up of a communication path through the IP network, including when one of the terminals, requester and requested, is of conventional type. Conversely, the topology server may be prompted to request the setting up of a communication path carried by the network of PABX sites, including when one of the terminals, requester and requested, is of IP type.

The invention provides for the possibility for each terminal to exhibit, apart from its native type, a complementary type (IP for a conventional terminal, and conventional for a native IP terminal).

The exhibiting of this double appearance may intervene a priori, that is to say prior to the call setup request on the requester side. It may also intervene on request, that is to say to serve a call configuration adopted by the topology server.

At the moment at which the exhibiting of the IP appearance is decided in respect of a conventional terminal, the call processing task of the reference CCU of the terminal consults a gateway designation table 92 to identify a gateway making it possible to reach the terminal.

The table 92 is constructed during the configuration of the system. It matches each cluster control unit 11-13, 21-25, 31-34, 40 with a gateway CCU (or several) whose gateway interface can, depending on the configuration of the system, connect up with the access points of said cluster control unit without going via the IP network. The table 92 can, for example, be stored in each CCU, so as to be able to be consulted in the processing of each half-call. When a new gateway to the IP network is set in place, the former broadcasts over the IP network, destined for all the CCUs, its location (site, CCU) as well as the location (site, CCU) of each CCU to which it has access inside the PABX system without going via the IP network. As a variant, the table of gateways 92 could be stored in a server accessible within the PABXs or on the IP network.

Figure 4:
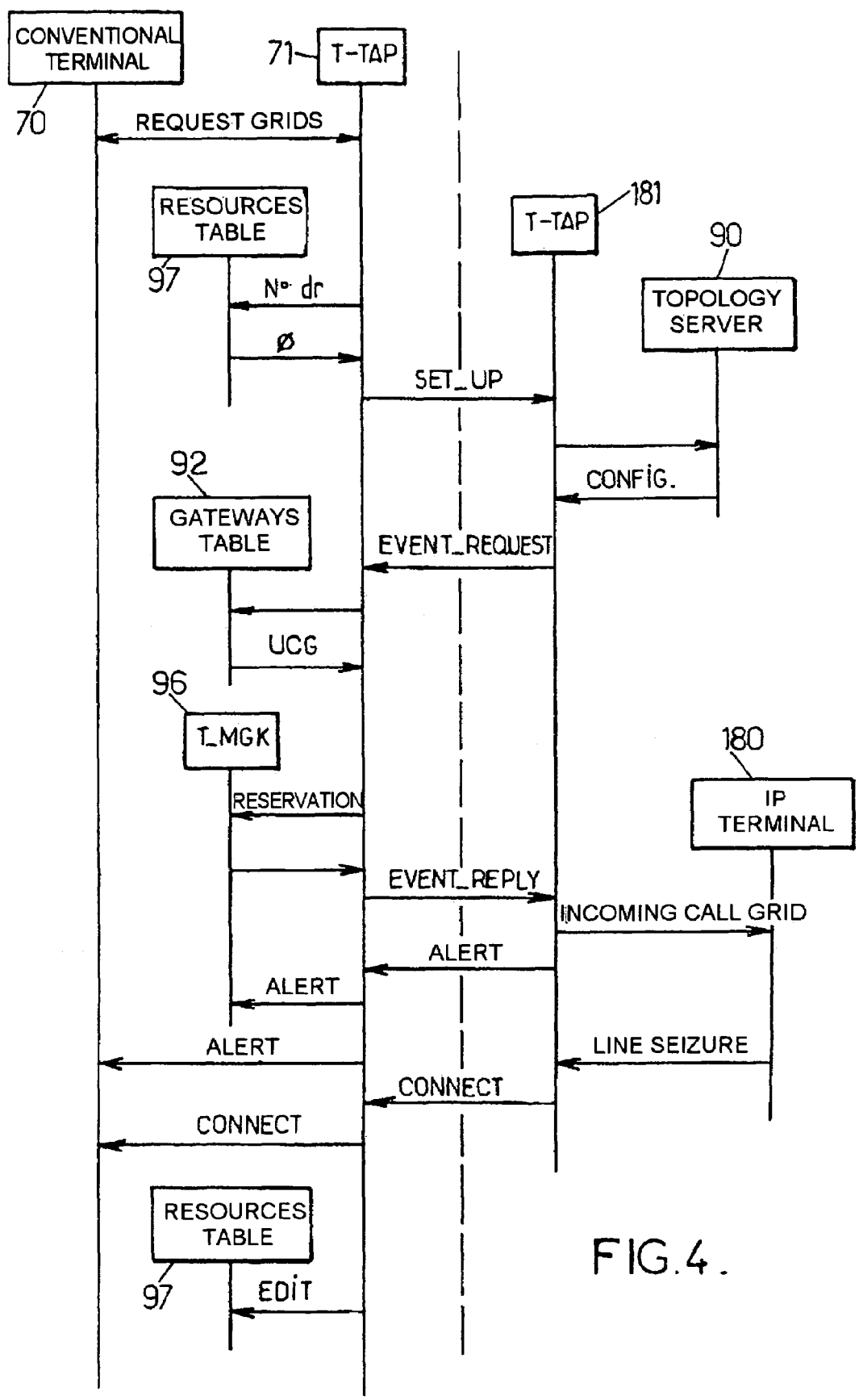
Figure 7:
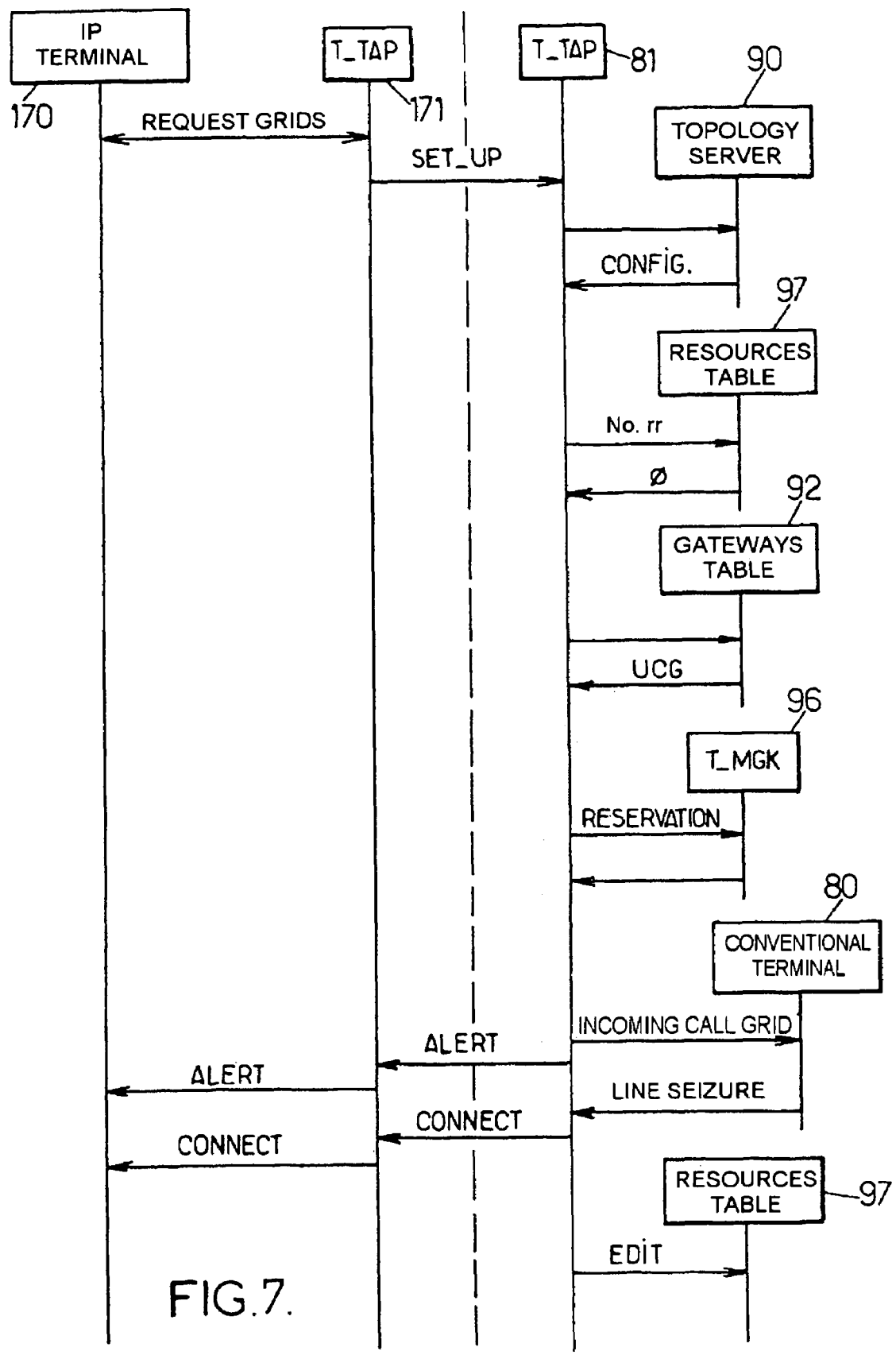

The call processing task of the reference CCU of the conventional terminal can thus obtain a list of locations (site number, CCU number in the site) of appropriate gateway CCUs so as to be able to exhibit the IP appearance. Preferably, gateway CCUs accessible from the reference CCU without passing via the IP network are favored, and in particular the gateway CCUs belonging to the same site as the reference CCU, if one exists. The T_CAP task then sends another setup message (SET_UP), that it directs to the CCU or CCUs designated by the table of gateway 92. On receipt of this message, the gateway facility management task (T_MGK) 96 executed by the processor of a gateways CCU concerned examines whether the gateway interface has resources for the communication currently being set up (FIGS. 4 and 7). If it does, it reserves two UDP port numbers for the RTP and RTCP connections, and responds to the call processing task T_CAP by returning the physical appliance number of the available gateway interface, its IP address in the network and the two reserve UDP port numbers.

The call server of the conventional terminal exhibiting the IP appearance then writes these parameters in memory 119 in a table of resources 97 so that these parameters can again be used on the assumption of one or more calls set up while the first call, having lead to the reservation of these resources, is still in progress. As soon as a "conventional" terminal participates in a call whose configuration requires the reserving of communication path resources on the IP network temporarily giving it an appearance of IP terminal, a single set of parameters (gateway IP address, UDP ports) is thus preserved in the table 97 and used until the last call context for this terminal is deleted. Such a terminal thus exhibits a double appearance, one native (conventional), and the other virtual (IP).

Figure 5:
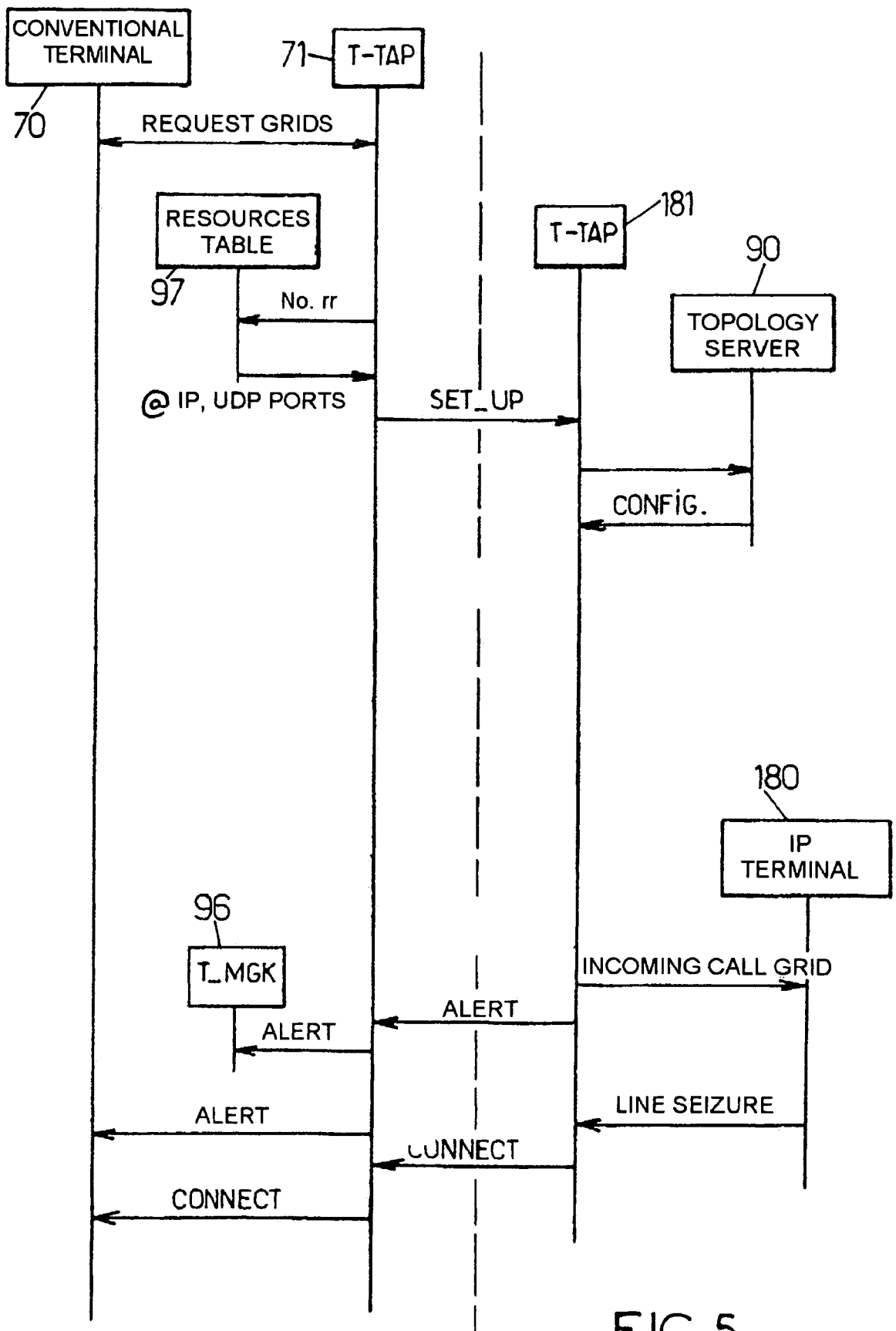

As shown by FIGS. 4 and 5, the table of resources 97 is consulted by the call processing task on the requester side before the broadcasting of the call setup message (SET_UP). The requester half-call can exhibit, as the case may be, a double appearance of the requester terminal to the requested half-call, thereby simplifying the process for setting up the call as a function of the configuration designated by the topology server, and minimizing unnecessary recourse to the gateway interfaces of the system.

A preferred embodiment of the invention, illustrated in the charts of FIGS. 3 to 7, favors the acquisition of a double appearance for the conventional terminals. A systematic search for double appearance may be implemented, in a very similar manner, for the entire batch of terminals of the system, or only for the IP terminals, so as to give them a conventional appearance.

Thus, in the charts of FIGS. 4 to 7, the T_CAP task 71, 81 relating to the conventional terminal interrogates, on the basis of the directory number of the requester (FIGS. 4 and 5) or of the requested (FIGS. 6 and 7), its table of resources 97, so as to verify whether a resource corresponding to the IP type is not already in use for a communication in progress in which the conventional terminal is participating. In the examples of FIGS. 4 to 7, the T_CAP task concerned thus verifies that a gateway interface has not already been reserved for the use by the terminal (FIGS. 4 and 5) or requested (FIGS. 6 and 7), that is to say that this terminal has not already taken an IP appearance. If so, it immediately has available a double set of parameters corresponding to the temporary duality of the types available for the terminal, that it can as the case may be (FIGS. 4 and 5) transmit in the setup message destined for the requested half-call. In the example in FIG. 5, it transmits in this way the CCU number of the gateway interface in which the voice over IP transport resources are reserved, the IP address and the UDP port numbers temporarily allotted to the terminal for its communication or communications in progress.

The table of resources 97 is updated (FIGS. 4 and 7) once the call server has exhibited the terminal's complementary appearance, so as to make available the parameters currently being used for any subsequent simultaneous calls concerning the terminal.

At the end of each communication, the call processing task verifies that the current call context is not the last for the, terminal whose half-call it is managing. If this is the case, it deletes the double-appearance data since these data have become obsolete given that the terminal is no longer participating in any communication and that one wishes to minimize the unnecessary reservation of resources in the gateways.

Figure 3:
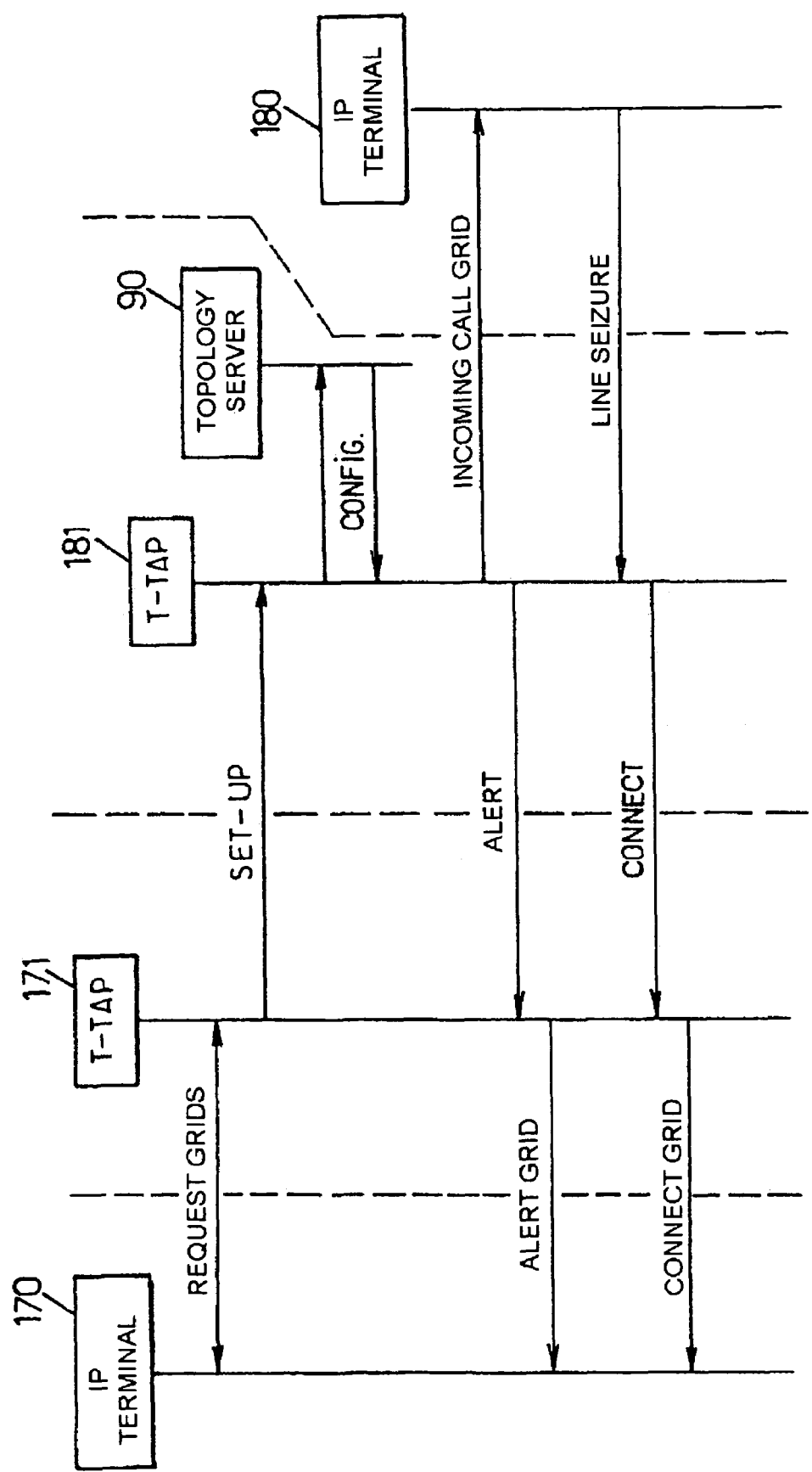
FIGS. 3 to 7 are charts illustrating examples of call signalling in the system of FIG. 1.

In the case of a call between two IP terminals 170, 180, the call configuration designated by the topology server 90 in response to its interrogation may correspond to the chart in FIG. 3. In this configuration, coded speech is exchanged between the terminals directly over the IP network 54-56. The T_CAP 181, executed in the call server (gateway CCU) on the arrival side, dispatches to the IP address of the requested terminal 180, if it is available, the grid indicating the incoming call, together with the IP address of the requester terminal 170 and the UDP ports used by the latter for the communication, that it has obtained in the setup message. Furthermore, it returns to the T_CAP task 171 of the departing half-call the alert message signaling the start of ringing to the requested terminal, together with the IP address of the requested terminal 180 and the UDP ports used by the latter for the communication. This alert message is forwarded in the form of a grid to the requester terminal 170, together with the IP address of the requested terminal 180 and the UDP ports used. When the requested terminal 180 seizes the line, the event is signaled to the T_CAP task 181 which informs the T_CAP task 171 thereof in a connection message forwarded in the form of a grid to the requester terminal 170. The communication can then take place, directly between the UDP ports for the traffic part, and within the framework of the TCP/IP sections between the terminals and their reference CCUs for the signalling part.

In the case where the double appearance may be exhibited for the IP terminals, the sending of the SET_UP message by the T_CAP task 171 is preceded by a consultation of the table of resources 97 (not represented in FIG. 3) of the call server. If appropriate, the parameters relating to the "conventional" appearance of the terminal 170 (coordinates of one or more gateways) are then included in the SET_UP message.

In the case of a call from a terminal of conventional type 70 to an IP terminal 180, the call configuration designated by the topology server 90 in response to its interrogation may correspond to the chart of FIG. 4, in the case of an initial call, and to the chart of FIG. 5, in the case of simultaneous multiple calls. Preferably, in both these cases the topology server 90 favors a communication path carried by the IP network.

In the chart of FIG. 4, the T_CAP task 181 on the arrival side, which receives the response from the topology server, requests the exhibiting of the complementary appearance by the requester terminal, given that in the setup message it has received only the parameters relating to the latter corresponding to its conventional type. To do this, it addresses to the T_CAP task 71 of the other half-call an event request message (EVENT_REQUEST), in which it indicates the configuration designated by the topology server 90.

On receipt of this message indicating to it that an IP appearance is necessary, the T_CAP task 71 consults the gateway designation table 92 on the basis of the location (site, CCU) of the requester terminal 70 to identify the CCU of at least one gateway interface from which the requester terminal 70 is accessible without going via the IP network. The T_CAP task 71 then sends a resource reservation request message, that it directs to the CCU or CCUs designated by the table 92. On receipt of this message, the gateway facility management task 96 (T_MGK) executed by the processor of a gateway CCU concerned examines whether the gateway interface has resources for the communication currently being set up. If so, it reserves two UDP port numbers for the RTP and RTCP connections, and responds to the task 71 by returning the physical appliance number of the available gateway interface, its IP address in the network 54-56 and the two reserved UDP port numbers.

The task 71 then sends an EVENT_REPLY message destined for the task 181 which contains the voiceover IP network transport parameters for the requester terminal, that is to say the physical appliance number of the available gateway interface, its IP address in the network and the two reserved UDP port numbers that it has received from the gateway CCU.

In the chart of FIG. 5, the T_CAP task 181 on the arrival side which receives the response of the topology server, already has parameters describing the requester terminal's double appearance since it has received them in the setup message SET_UP. It thus has the parameters necessary for setting up the call configuration designated by the topology server.

The call setup phase then continues in both cases in the following manner: the T_CAP task 181, executed in the gateway CCU on the arrival side, dispatches the IP address of the requested terminal 180, if the latter is available, the grid indicating the incoming call, together with the IP address relating to the requester terminal 70 and the UDP ports used by the gateway under this address for the communication. The T_CAP task 181 instructs, with the aid of the CPM utility, the setting up of a communication path in the. PABX network, then returns to the T_CAP task 71 of the departing half-call the alert message signaling the start of ringing to the requested terminal, together with the IP address of the requested terminal 180 and the UDP ports used by the latter for the communication. This alert message is forwarded in the form of a grid to the requester terminal 70 and communicated to the gateway interface management task 96, together with the IP address of the requested terminal 180 and the UDP ports used.

The T_MGK task 96 of the CCU of the gateway interface completes the requester side communication path by instructing the IP interface 112, the switching matrix 117 and the interface 111-115 to which the terminal is linked so that the interfaces cater for the translations required and that the matrix 117 makes them intercommunicate.

When the requested terminal 180 seizes the line, the event is signaled to the T_CAP task 181 which informs the T_CAP task 71 thereof in a connection message (CONNECT) forwarded in the form of a grid to the requester terminal 70. The communication can then take place:

- the G.711-coded speech transmitted by the conventional terminal 70 is routed up to the gateway interface within one or more PABXs, may possibly be transcoded, and is then dispatched over the IP network to the IP address and to the UDP port associated with the requested IP terminal:
- the IP terminal 180 dispatches its coded speech in the form of RTP packets destined for the UDP/IP port which was indicated to it with the incoming call grid, and the facility management task T_MGK of the destination gateway interface reconstructs the coded speech signal stream, carries out a transcoding as appropriate, and forwards the G.711-coded speech up to the conventional terminal 70;
- the T_CAP tasks 71 and 181 (more precisely the T_MGW and/or T_MGC tasks) remain in force up to the end of the communication, as does the TCP/IP session transporting the signalling between the IP terminal 180 and its reference CCU.

Figure 6:
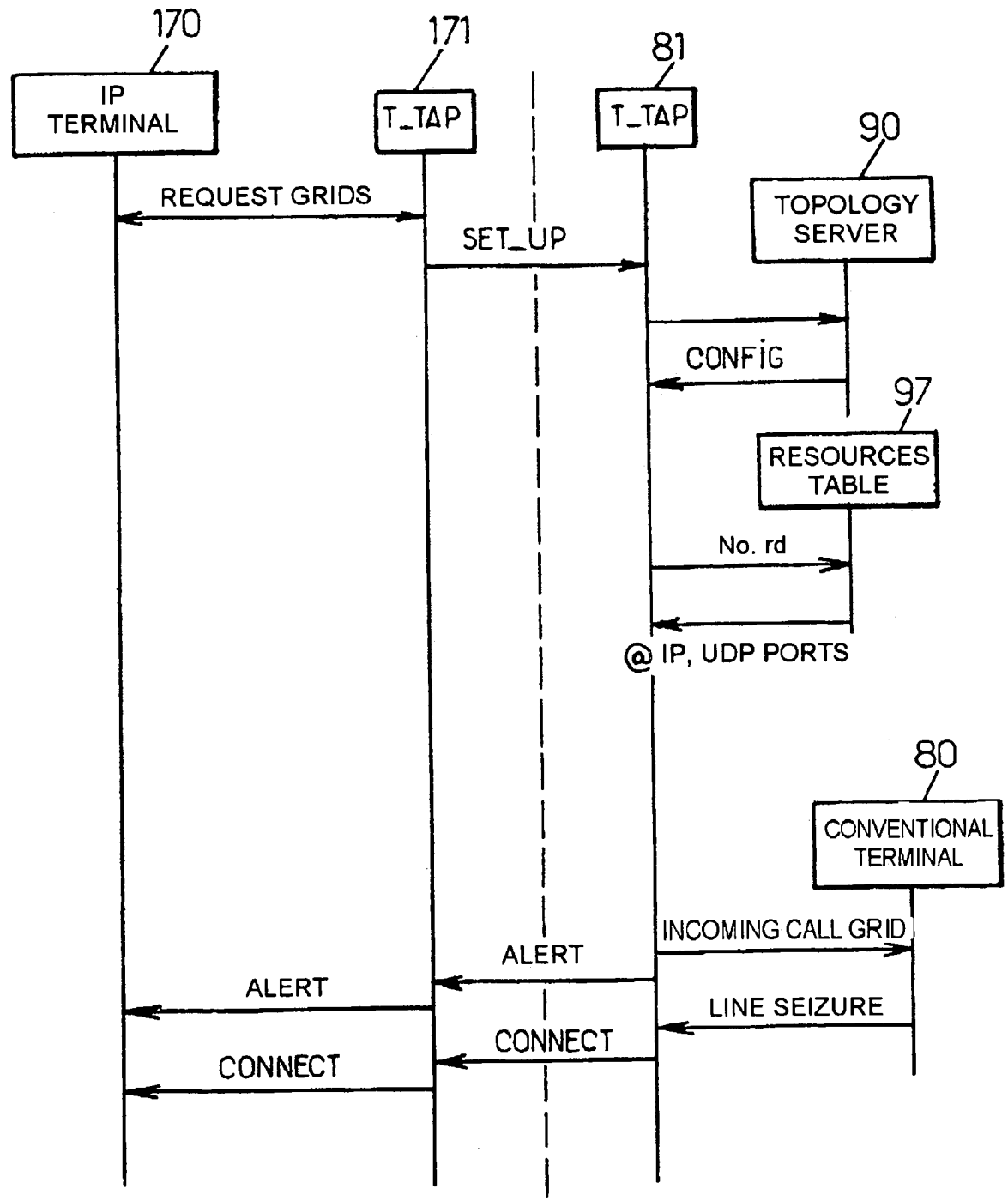

In the case of a call from an IP terminal 170 to a terminal of conventional type 80, the call configuration designated by the topology server 90 in response to its interrogation by the task 81 on the arrival side may correspond to the chart of FIG. 7 in the case of an initial call, and to the chart of FIG. 6 in the case of simultaneous multiple calls. Preferably, the topology server 90 favors a communication path carried by the IP network. The response of the topology server is equivalent in this case to a request to take IP appearance for any terminal participating in the communication currently being set up which might not be of IP type.

The call processing task T_CAP 81 on the arrival side therefore consults its resources table 97, to verify whether a resource corresponding to the type complementary to the native type of the requested terminal, in this instance an IP gateway, is not already used for a communication in progress in which the requested is participating.

If so (chart of FIG. 6), it immediately has the CCU number of a gateway interface, the IP address and the UDP port numbers temporarily allotted to the terminal for its communication in progress.

If not (chart of FIG. 7), it consults the gateway designation table 92 to identify the CCU of at least one gateway interface from which the requested terminal 80 would be accessible without leaving the PABX network. It then sends a resource reservation request message, which it directs to the CCU or CCUs designated by the table 92, indicating the IP address of the requester terminal 170 and the UDP port numbers that it uses for the RTP and RTCP protocols. On receipt of this message, the gateway facility management task 96 (T_MGK) executed by the processor of a gateway CCU concerned examines whether the gateway interface has resources for the communication currently being set up. If so, it reserves two UDP port numbers for the RTP and RTCP connections, and responds to the task 81 by returning the physical appliance number of the available gateway interface, its IP address in the network and the two reserve UDP port numbers.

The call setup phase then continues in both cases in the following manner: the T_CAP task 81 executed in the gateway CCU on the arrival side, dispatches to the requested terminal 80, if the latter is available, the grid indicating the incoming call, as well as the indication of the gateway interface associated therewith. The task 81 instructs, with the aid of the CPM utility, the setting up of a communication path. It returns to the T_CAP task 171 of the departing half-call the alert message (ALERT) signaling the start of ringing to the requested terminal, which message provides the task 171 with the IP address and the UDP port numbers temporarily allotted to the terminal. This alert message is forwarded in the form of a grid to the requester terminal 170, in one or more TCP/IP segments addressed to the terminal by its reference CCU, together with the IP address of the gateway interface to be used and the UDP ports reserved on the requested side for the communication.

When the requested terminal 80 seizes the line, the event is signaled to the T_CAP task 81 which informs the T_CAP task 171 thereof in a connection message (CONNECT) forwarded in the form of a grid to the requester terminal 170.

The T_MGK task of the CCU of the gateway interface completes the requested side communication path by instructing the IP interface 112, the switching matrix 117 and the interface 111-115 to which the terminal is linked so that the interfaces cater for the translations required and that the matrix 117 makes them intercommunicate. The communication can then take place:

- the IP terminal 170 dispatches its coded speech in the form of RTP packets destined for the UDP/IP port which was indicated to it with the alert grid, and the destination gateway interface reconstructs the coded speech signal stream, carries out as the case may be a transcoding, and forwards the G.711 coded speech up to the conventional terminal 80;
- the G.711 coded speech transmitted by the conventional terminal 80 is routed up to the gateway interface within one or more PABXs, may possibly be transcoded, and is then dispatched over the IP network to the UDP port which was specified in the setup message;
- the T_CAP tasks 171 and 81 (more precisely the T_MGW and/or T_MGC tasks) remain in force up to the end of the communication, as does the TCP/IP session transporting the signalling between the IP terminal 170 and its reference CCU.

In another embodiment of the invention, the taking of double appearance is performed a priori for a requester terminal, that is to say before being aware of the call configuration designated by the topology server 90. In this case, the consultation of the resources table 97 occurs as soon as a call setup request is received by the call server of the requester terminal, and is followed immediately if necessary by a reserving of resources by consultation of the gateways table 92 and of the T_MGK task 96.

On the requested side, it is also possible to envisage a taking of double appearance a priori, that is to say without being aware of the call configuration designated by the topology server 90. The multiplicity of appearances offered on the requester and/or requested side may possibly be taken into account in the decision of the topology server.

In this embodiment, it is desirable to release the resources reserved a priori and which turn out to be unnecessary in view of the call configuration adopted. The call processing task concerned will therefore dispatch an instruction to update the resources table 97 for the case where there is no longer any call context other than that of the call in progress for the terminal for which the resource reservation has been performed.

It should be noted that the IP appearance may be adopted for a conventional terminal even in cases where it would communicate with another conventional terminal. This occurs in particular if the communication path goes via a gateway interface with the IP network, either because the two conventional terminals cannot get in touch with one another without going via the IP network, or because this was imposed by the topology server.

The invention claimed is:

1. A method for setting up communication paths between access points of a switching system, the switching system comprising a packet transmission network affording a first family of access points, switching means equipped with linking interfaces affording a second family of access points and with at least one gateway interface with the packet transmission network, and call processing means for storing configuration data and context data relating to terminals connected to the system through the access points, and for performing signalling processing relating to said terminals, wherein the setting up of a first communication path between access points so as to connect up first and second terminals respectively connected to said access points comprises the following steps when the first path comprises at least one first portion belonging to the packet transmission network and one second portion belonging to the switching means with a gateway interface between said first and second portions:

associating with said first portion an addressing resource of the gateway interface in the packet transmission network for the connection with the first terminal;

associating with said second portion an addressing resource of the gateway interface in the switching means for the connection with the second terminal;

storing, in the context data relating to the second terminal, an identification of said addressing resource of the gateway interface in the packet transmission network.

2. The method as claimed in claim 1, wherein in order to connect up the second terminal with a third terminal without cuffing the connection with the first terminal, the stored identification of said addressing resource of the gateway interface in the packet transmission network is read from the context data relating to the second terminal, and a second communication path is set up including the second portion of the first path and at least one other portion belonging to the packet transmission network, with which is associated the read addressing resource of the gateway interface for the connection with the third terminal.

3. The method as claimed in claim 1, wherein the setting up of the first communication path comprises the storage, in the context data relating to the first terminal, of an identification of said addressing resource of the gateway interface in the switching means.

4. The method as claimed in claim 1, wherein the packet transmission network operates according to the IP protocol and said addressing resource of the gateway interface in the packet transmission network comprises an IP address of the gateway interface in the network and at least one UDP port number reserved in conjunction with said IP address.

5. The method as claimed in claim 1, wherein the call processing means of the switching system comprise at least one call server associated with certain at least of the terminals, wherein the call processing means interrogate a call configuration manager to obtain call configuration data in response to two sets of parameters relating to requester and requested terminals, respectively, said set of parameters relating to a terminal incorporating an indication of the family of the access point to which it is connected, said call configuration data indicating whether the communication path to be set up comprises a gateway interface.

6. The method as claimed in claim 5, comprising the following steps for setting up a communication between requester and requested terminals:

creation of a first call processing task in the call server associated with the requester terminal;

formation, by the first call processing task, of a setup message including at least one number of the requested terminal and the indication of the family of the access point to which the requester terminal is connected;

in response to the receipt of said setup message, creation of a second call processing task in the call server associated with the requested terminal;

interrogation of the configuration manager by the second call processing task, on the basis of a set of parameters relating to the requester terminal which are extracted from the set up message and a set of parameters relating to the requested terminal which are deduced by the second call processing task from the number received in the setup message; and definition of the communication path between the access points to which the requester and requested terminals are connected in accordance with the call configuration data obtained from the configuration manager.

7. The method as claimed in claim 6, wherein the setup message includes the identification of a gateway interface addressing resource stored in the context data relating to the requester terminal.

8. The method as claimed in claim 6, wherein, when the call configuration data obtained from the configuration manager indicate that the communication path to be set up comprises a gateway interface, the second call processing task addresses a request to the first call processing task so that it returns the identification of an addressing resource of the gateway interface to it.

9. A method of setting up communication paths between access points of a switching system, the switching system comprising a packet transmission network affording a first family of access points, switching means equipped with linking interfaces affording a second family of access points and with at least one gateway interface with the packet transmission network, and call processing means for storing configuration data and context data relating to terminals connected to the system through the access points, and for performing signalling processing relating to said terminals, wherein the setting up of a first communication path between access points so as to connect up first and second terminals respectively connected to said access points comprises the following steps when the first path comprises at least one first portion belonging to the packet transmission network and one second portion belonging to the switching means with a gateway interface between said first and second portions:

associating with said first portion an addressing resource of the gateway interface in the packet transmission network for the connection with the first terminal;

associating with said second portion an addressing resource of the gateway interface in the switching means for the connection with the second terminal;

storing, in the context data relating to the first terminal, an identification of said addressing resource of the gateway interface in the switching means.

10. The method as claimed in claim 9, wherein in order to connect up the first terminal with a third terminal without cutting the connection with the second terminal, the stored identification of said addressing resource of the gateway interface in the switching means is read from the context data relating to the first terminal, and a second communication path is set up including the first portion of the first path and at least one other portion belonging to the switching means, with which is associated the read addressing resource of the gateway interface for the connection with the third terminal.

11. The method as claimed in claim 9, wherein said addressing resource of the gateway interface in the switching means comprises a physical address of said interface in the switching means.

12. The method as claimed in claim 9, wherein the call processing means of the switching system comprise at least one call server associated with certain at least of the terminals, wherein the call processing means interrogate a call configuration manager to obtain call configuration data in response to two sets of parameters relating to requester and requested terminals, respectively, said set of parameters relating to a terminal incorporating an indication of the family of the access point to which it is connected, said call configuration data indicating whether the communication path to be set up comprises a gateway interface.

13. The method as claimed in claim 12, comprising the following steps for setting up a communication between requester and requested terminals:
- creation of a first call processing task in the call server associated with the requester terminal;
- formation, by the first call processing task, of a setup message including at least one number of the requested terminal and the indication of the family of the access point to which the requester terminal is connected;
- in response to the receipt of said setup message, creation of a second call processing task in the call server associated with the requested terminal;
- interrogation of the configuration manager by the second call processing task, on the basis of a set of parameters relating to the requester terminal which are extracted from the set up message and a set of parameters relating to the requested terminal which are deduced by the second call processing task from the number received in the setup message; and
- definition of the communication path between the access points to which the requester and requested terminals are connected in accordance with the call configuration data obtained from the configuration manager.

14. The method as claimed in claim 12, wherein the setup message includes the identification of a gateway interface addressing resource stored in the context data relating to the requester terminal.

15. The method as claimed in claim 12, wherein, when the call configuration data obtained from the configuration manager indicate that the communication path to be set up comprises a gateway interface, the second call processing task addresses a request to the first call processing task so that it returns the identification of an addressing resource of the gateway interface to it.

16. A switching system comprising a packet transmission network affording a first family of access points, switching means equipped with linking interfaces affording a second family of access points and with at least one gateway interface with the packet transmission network, and call processing means for storing configuration data and context data relating to terminals connected to the system through the access points, and for performing signal processing relating to said terminals,
the switching system being arranged for setting up a first communication path between access points so as to connect up first and second terminals respectively connected to said access points, and comprising means for, when the first path comprises at least one first portion belonging to the packet transmission network and one second portion belonging to the switching means with a gateway interface between said first and second portions:
- associating with said first portion an addressing resource of the gateway interface in the packet transmission network for the connection with the first terminal;
- associating with said second portion an addressing resource of the gateway interface in the switching means for the connection with the second terminal;
- storing, in the context data relating to the second terminal, an identification of said addressing resource of the gateway interface in the packet transmission network.

17. A switching system comprising a packet transmission network affording a first family of access points, switching means equipped with linking interfaces affording a second family of access points and with at least one gateway interface with the packet transmission network, and call processing means for storing configuration data and context data relating to terminals connected to the system through the access points, and for performing signal processing relating to said terminals in accordance with a method according to any one of the preceding claims, the switching system being arranged for setting up a first communication path between access points so as to connect up first and second terminals respectively connected to said access points, and comprising means for, when the first path comprises at least one first portion belonging to the packet transmission network and one second portion belonging to the switching means with a gateway interface between said first and second portions:
- associating with said first portion an addressing resource of the gateway interface in the packet transmission network for the connection with the first terminal;
- associating with said second portion an addressing resource of the gateway interface in the switching means for the connection with the second terminal;
- storing, in the context data relating to the first terminal, an identification of said addressing resource of the gateway interface in the switching means.

* * * * *